US012809683B2

(12) United States Patent
Swami et al.

(10) Patent No.: US 12,809,683 B2
(45) Date of Patent: Nov. 24, 2026

(54) BATCH PROCESSING OF MULTI-CHANNEL DATA

(71) Applicant: TEXAS INSTRUMENTS INCORPORATED, Dallas, TX (US)

(72) Inventors: Pramod Swami, Bangalore (IN); Mihir Mody, Bangalore (IN); Deepak Poddar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 536 days.

(21) Appl. No.: 18/361,401

(22) Filed: Jul. 28, 2023

(65) Prior Publication Data

US 2024/0338253 A1 Oct. 10, 2024

(30) Foreign Application Priority Data

Apr. 5, 2023 (IN) ............................ 202341025676

(51) Int. Cl.
*G06F 9/46* (2006.01)
*G06F 9/50* (2006.01)

(52) U.S. Cl.
CPC .................................. *G06F 9/5038* (2013.01)

(58) Field of Classification Search
CPC ..................................................... G06F 9/5038
See application file for complete search history.

(56) References Cited

U.S. PATENT DOCUMENTS

2015/0180436 A1* 6/2015 Tassart .................. H03G 5/165 381/103
2020/0278824 A1* 9/2020 Rub .................... G06F 15/7817
2022/0066813 A1* 3/2022 Taher .................... G06F 9/5038
2022/0100680 A1* 3/2022 Chrysos ............. G06F 13/4027

FOREIGN PATENT DOCUMENTS

CN 113610213 A * 11/2021 ............ G06N 3/045

* cited by examiner

*Primary Examiner* — Diem K Cao
(74) *Attorney, Agent, or Firm* — Carl G. Peterson; Charles F. Koch

(57) ABSTRACT

Various examples disclosed herein relate to digital signal processing, and more particularly, to processing stages of multi-channel processing pipelines in batches according to an order. A method of such processing is provided and includes retrieving multi-channel data from a memory and processing the multi-channel data with a hardware accelerator implementing a multi-stage processing pipeline for each channel of a plurality of channels. The multi-stage processing pipelines can be arranged in a cyclically descending order based on a total number of stages of each multi-stage processing pipeline. Processing the multi-channel data includes sequentially processing a plurality of batches each including one or more stages from different multi-stage processing pipelines adjacent to each other in the cyclically descending order. Processing the plurality of batches may include processing corresponding ones of the stages in parallel.

26 Claims, 7 Drawing Sheets

BATCH PROCESSING OF MULTI-CHANNEL DATA

CROSS-REFERENCE TO RELATED APPLICATIONS

This application claims priority to and the benefit of India Provisional Patent Application No. 202341025676, titled "ENHANCED MULTI-CHANNEL BIQUAD FILTERING ALGORITHM," filed Apr. 5, 2023, which is incorporated by reference herein in its entirety.

TECHNICAL FIELD

This disclosure relates generally to data processing, and in particular embodiments, to batch processing of multi-channel data.

BACKGROUND

In audio and voice applications, various digital signal processing techniques may be employed to improve quality of the audio and voice data, reduce noise in the audio and voice signals, and more. For example, audio processing systems can receive bit streams from a microphone, speaker, or other audio channel, and analyze the bit streams to adjust the gain, filter out noise, or change other parameters of the bit streams to output higher fidelity audio signals.

Various audio and voice applications employ filters to process such audio and voice data. For example, such applications may use infinite impulse response (IIR) filters to process data for each of multiple inputs (e.g., microphones). An example IIR filter may be a biquadratic filter. A series of any number of IIR filters may be used for each input channel, and each input channel may have any number of samples to which an IIR filter operation can be applied.

SUMMARY

Disclosed herein are improvements to parallel processing of multi-channel data corresponding to multiple input channels, and more specifically, to processing the multi-channel data in batches in accordance with a sequential, cyclically descending order. The input channels may correspond to one or more microphones, speakers, or other audio or speech inputs, and each input channel may include the same or different audio or speech data. The input channels may, however, include other types of input sources. Processing the multi-channel data produced by the input channels may include performing one or more operations, such as filtering operations, to improve quality and fidelity of the multi-channel data, for example. The more filtering operations performed on data of an input channel, the higher quality or fidelity data may be produced. Processing multi-channel data of multiple input channels, however, may require large amounts of processing capacity. To reduce processing complexity, capacity, and time, operations of the input channels may be processed in batches and in accordance with a sequential, cyclically descending order, among other orders. The cyclically descending order may include performing operations on data of the input channels organized from most operations to least operations with respect to the input channels. In this way, the number of batches, and consequently, the number of operations and processing cycles may be reduced to at least improve processing efficiency.

In an example embodiment, a method of processing multi-channel data in accordance with a determined order is provided. The method includes retrieving multi-channel data from a memory and processing the multi-channel data with a hardware accelerator implementing a multi-stage processing pipeline for each channel of a plurality of channels. The multi-stage processing pipelines are arranged in a cyclically descending order based on a total number of stages of each multi-stage processing pipeline. Processing the multi-channel data includes sequentially processing a plurality of batches. Each batch of the plurality of batches includes one or more stages from different multi-stage processing pipelines and that are adjacent to each other in the cyclically descending order. Processing each batch of the plurality of batches includes processing the corresponding one or more stages of different channels in parallel. A first batch of the plurality of batches includes a plurality of stages, and each stage of the multi-stage processing pipeline of each channel has a loop-carry dependency.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some examples, components or operations may be separated into different blocks or may be combined into a single block.

DETAILED DESCRIPTION

Figure 1:
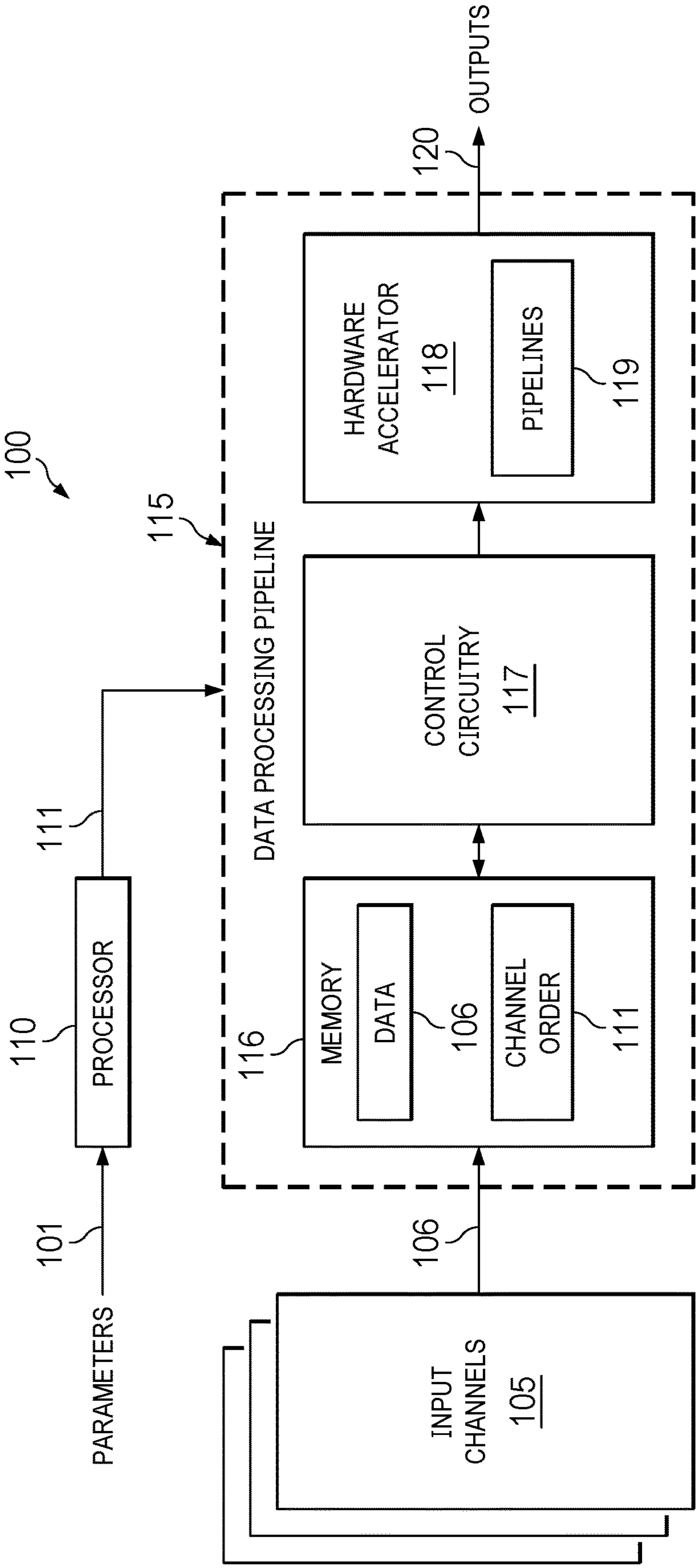
FIG. 1 illustrates an example operating environment configurable to process data via multi-channel processing pipelines in an implementation.

Embodiments of the present disclosure are described in specific contexts, e.g., batch processing of audio data using multi-stage filtering pipelines, e.g., using infinite impulse response filters (IIR filters), such as biquadratic filters, e.g., using a hardware accelerator. Some embodiments may be used with other types of data (e.g., non-audio data, such as images and the like). Some embodiments may use other types of processing stages, such as non-filter stages that exhibit loop-carry dependency.

Discussed herein are enhanced components, techniques, systems, and methods related to parallel processing of multi-channel data corresponding to multiple input channels, and in some embodiments, to processing the multi-channel data in batches in accordance with a sequential, cyclically descending order. Each input channel may produce data that may be processed via a processing system. For example, the input channels may output audio or voice data that can be processed using a digital signal processing (DSP) system. The DSP system may include one or more components implemented in hardware, software, and/or firmware that may implement multi-stage processing pipelines, each pipeline corresponding to an input channel, to process data of the multiple input channels. Filters, such as IIR filters, may exhibit loop-carry dependency, which may require several processing cycles due to the loop-carry dependency. Thus, applications using IIR filters can fail to fully utilize available processing power of processor(s) (e.g., very-long instruction word processors), which may result in increased numbers of processing cycles to process audio and voice data.

In some examples, the input channels may output another type of data processible in another fashion. However, processing other types of data via multi-stage processing pipelines may still suffer from loop-carry dependency.

To reduce processing complexity and required processing cycles for implementing multi-stage processing pipelines having loop-carry dependencies, multi-channel data produced by the plurality of input channels may be organized not only in batches but also in a cyclically descending order. The cyclically descending order may include performing operations on data of the input channels organized from most operations per channel to least operations per channel with respect to the input channels, where each channel includes a respective pipeline of operations. Advantageously, in this way, batches of data from the input channels may be processed sequentially, where operations within a batch (e.g., across multiple input channels) are performed in parallel, such that the total number of operations and processing cycles may be reduced to at least improve processing efficiency of a system. In other examples, however, another arrangement or order of batches may be contemplated (e.g., cyclically ascending order).

One example embodiment includes a method. The method includes retrieving multi-channel data from a memory and processing the multi-channel data with a hardware accelerator implementing a multi-stage processing pipeline for each channel of a plurality of channels. The multi-stage processing pipelines are arranged in a cyclically descending order based on a total number of stages of each multi-stage processing pipeline. Processing the multi-channel data includes sequentially processing a plurality of batches. Each batch of the plurality of batches includes one or more stages from different multi-stage processing pipelines and that are adjacent to each other in the cyclically descending order. Processing each batch of the plurality of batches includes processing the corresponding one or more stages in parallel. A first batch of the plurality of batches includes a plurality of stages, and each stage of the multi-stage processing pipeline of each channel has a loop-carry dependency.

In another example embodiment, a device including memory and a hardware accelerator coupled to the memory is provided. The hardware accelerator is configured to retrieve multi-channel data from the memory and process the multi-channel data by implementing a multi-stage processing pipeline for each channel of a plurality of channels. The multi-stage processing pipelines are arranged in a cyclically descending order based on a total number of stages of each multi-stage processing pipeline. Processing the multi-channel data includes sequentially processing a plurality of batches. Each batch of the plurality of batches includes one or more stages from different multi-stage processing pipelines and that are adjacent to each other in the cyclically descending order. Processing each batch of the plurality of batches includes processing the corresponding one or more stages in parallel. A first batch of the plurality of batches includes a plurality of stages, and each stage of the multi-stage processing pipeline of each channel has a loop-carry dependency.

In yet another embodiment, an integrated circuit including control circuitry and hardware accelerator circuitry is provided. The control circuitry is configured to identify multi-channel data from a memory and provide the multi-channel data to the hardware accelerator circuitry in response to a request to process the multi-channel data. The hardware accelerator circuitry is configured to process the multi-channel data by implementing a multi-stage processing pipeline for each channel of a plurality of channels, wherein the multi-stage processing pipelines are arranged in a cyclically descending order based on a total number of stages of each multi-stage processing pipeline. Processing the multi-channel data includes sequentially processing a plurality of batches. Each batch of the plurality of batches includes one or more stages from different multi-stage processing pipelines and that are adjacent to each other in the cyclically descending order. Processing each batch of the plurality of batches includes processing the corresponding one or more stages in parallel. A first batch of the plurality of batches includes a plurality of stages, and each stage of the multi-stage processing pipeline of each channel has a loop-carry dependency.

FIG. 1 illustrates an example operating environment configurable to process data via multi-channel processing pipelines in an implementation. FIG. 1 shows operating environment 100, which includes input channels 105, processor 110, and data processing pipeline 115. Data processing pipeline 115 may include memory 116, control circuitry 117, and hardware accelerator 118. Data processing pipeline 115 may obtain data 106 from input channels 105 and channel order 111 from processor 110 to generate outputs 120. In various examples, elements of data processing pipeline 115, such as control circuitry 117 and/or hardware accelerator 118, may be configured to operate multi-channel filtering processes, such as process 200 of FIG. 2, on data 106.

Input channels 105 are representative of a plurality of inputs coupled to provide data 106 to data processing pipeline 115. Input channels 105 may include any number of channels, and each channel may output different signals relative to one another or the same signals as one or more of the other channels. In various examples, input channels 105 provide digital signals representative of audio or voice data (e.g., from a microphone or other audio source, and, e.g., for a speaker or other audio output, or the like) to data processing pipeline 115. In other examples, input channels 105 produce analog signals, which may be converted by conversion circuitry (not shown, such as an analog-to-digital converter (ADC)) to digital signals before being provided to data processing pipeline 115. In some embodiments, input channels 105 may output data other than audio or voice data to data processing pipeline 115. In addition to audio or voice samples, data 106 may also include one or more coefficients. For example, each of input channels 105 may include a number of coefficients specific to a respective input channel (e.g., specific to each processing stage of each input channel). The coefficients may be used in processing data 106 associated with a respective input channel.

In some embodiments, data processing pipeline 115 is representative of a system capable of obtaining data 106 from input channels 105, performing one or more operations on data 106, and generating outputs 120. For example, data processing pipeline 115 may be implemented with a digital signal processing (DSP) system, or a portion thereof. In some embodiments, data processing pipeline 115 may include memory 116, control circuitry 117, and hardware accelerator 118.

In some embodiments, memory 116 may include any non-transitory, computer-readable storage media capable of being read from and written to by various components, such as input channels 105, processor 110, control circuitry 117, and hardware accelerator 118, among other elements. In some embodiments, memory 116 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. Memory 116 may store data 106 produced by input channels 105 for use by control circuitry 117 and hardware accelerator 118.

Control circuitry 117 is representative of one or more hardware components capable of controlling hardware accelerator 118 and reading out data 106 from memory 116 to hardware accelerator 118 in accordance with a sequential order determined by processor 110 (i.e., channel order 111). For example, control circuitry 117 may perform one or more load operations to load data 106 from memory 116 to hardware accelerator 118. The load operations may entail loading portions of data 106, such as samples and corresponding coefficients, to hardware accelerator 118 at various times in accordance with channel order 111 determined by processor 110.

Hardware accelerator 118 is representative of one or more hardware components capable of performing one or more operations on data 106 per channel order 111. For example, hardware accelerator 118 may implement multi-stage pipelines 119 to process data 106. Pipelines 119 include a plurality of processing pipelines, each pipeline including a plurality of processing stages for processing incoming multi-channel data 106. In some cases, the total number of pipelines 119 may correspond to the total number of input channels 105. Each pipeline may include a number of stages corresponding to a number of operations to be performed on data 106. The number of stages may vary between each of the pipelines 119 and may depend on a desired output with respect to data 106 corresponding to an input channel. For example, one pipeline may have more stages than another pipeline based on a desired fidelity or amount of filtering of data 106 associated with the corresponding input channel. It may follow that the more stages a pipeline includes, the more filtering may be performed on respective data. In various examples, the operations that hardware accelerator 118 performs at each stage of pipelines 119 may include filter operations. For instance, each stage may be an infinite impulse response (IIR) filter, such as a biquadratic filter. IIR filters have loop-carry dependencies, such that the output and input of each filter have dependencies on each other. As such, each stage of a pipeline may have loop-carry dependency, and thus, hardware accelerator 118 may process the stages of a pipeline in a sequential order.

Hardware accelerator 118 may perform operations on pipelines 119 in batches and in accordance with an order. For example, the order may be a sequential, cyclically descending order with respect to the individual stages of each pipeline. In other examples, the order may be another sorted order, such as a cyclically ascending order. The batches may include subsets of the stages across pipelines 119. Some batches may include the same number of stages as each other, but some batches may include fewer stages relative to other batches. When a batch has fewer stages than another batch, hardware accelerator 118 may perform a null operation in parallel with performing an operation on one or more stages in the batch, e.g., so that each batch performs the same number of operations.

The channel order 111 in which control circuitry 117 reads out or provides data 106 to hardware accelerator 118 for processing data 106 may be determined by processor 110. In some embodiments, processor 110 is representative of one or more processor cores capable of executing software and/or firmware and is coupled to provide channel order 111 to memory 116 of data processing pipeline 115 for use by control circuitry 117. Such processor cores(s) may include cores of microcontrollers, DSPs, general purpose central processing units, application specific processors or circuits (e.g., ASICs), and logic devices (e.g., FPGAs), as well as any other type of processing device, combinations, or variations thereof.

In various examples, processor 110 may obtain parameters 101 and produce channel order 111 for use by data processing pipeline 115 based on parameters 101. Parameters 101 may refer to information about input channels 105 and corresponding pipelines 119. For instance, parameters 101 may include information such as the number of pipelines 119 and the number of stages of each pipeline. In some embodiments, parameters 101 may be provided, e.g., by an external circuit (not shown), be stored in memory 116, and/or be determined (e.g., by processor 110) based on a state of hardware accelerator 118 and/or control circuitry 117.

Based on parameters 101, processor 110 may determine channel order 111, which may define a sequential, cyclically descending order for which control circuitry 117 may use to read out data 106 to hardware accelerator 118. More specifically, channel order 111 may identify an order or arrangement that each pipeline, and each stage of each pipeline, may be processed by hardware accelerator 118 relative to other pipelines.

To determine channel order 111, processor 110 may identify the number of stages of each pipeline in hardware accelerator 118 based on parameters 101. Processor 110 may sort pipelines 119 from greatest to least with respect to the number of stages. Next, processor 110 may determine a batch size that includes subsets of individual stages of pipelines 119 for processing stages of multiple pipelines in parallel. The batch size may be determined based on one or more factors. For example, the batch size may be determined based on a number of multipliers of hardware accelerator 118. In another example, the batch size may instead be determined based on a number of load resources of hardware accelerator 118. A load resource may refer to a resource capable of loading data from memory 116 to hardware accelerator 118. In yet another example, the batch size may be determined based on a total number of input channels 105, e.g., divided by two, or based on a multiple of the total number of input channels 105. Alternatively, the batch size may be determined based on the nature of the loop-carry dependency of the stages of pipelines 119, e.g., such as the number of delay stages of the loop-carry dependency.

By way of example, input channels 105 may include four channels. Accordingly, hardware accelerator 118 may include four pipelines corresponding to the four channels. Each of the four channels may include a different number of stages. Processor 110 may identify the number of stages of each channel (e.g., based on parameters 101) and sort the channels according to the number of stages. Processor 110 may determine a batch size to process data 106 of two or more of the channels in parallel. In this example, processor 110 may determine the batch size to be two stages. Thus, processor 110 may determine channel order 111 that defines the pipeline with the most number of stages and the pipeline with the second most number of stages to be read out to hardware accelerator 118 in parallel first. Channel order 111 may further define the pipelines with the third and fourth most number of stages to be read out to hardware accelerator 118 in parallel second. When reading out data 106 in accordance with channel order 111, control circuitry 117 may read data corresponding to a first stage of the first pipeline in channel order 111 and data corresponding to a first stage of the second pipeline in channel order 111 to hardware accelerator 118 for the first batch. Subsequently, control circuitry 117 may read data corresponding to a first stage of the third and fourth pipelines in the channel order 111 to hardware accelerator 118 for the second batch. Processor 110 may define this cycle of batches and corresponding stages of pipelines in channel order 111 in a descending order through the stages of the pipelines until all stages of the pipelines are mapped. In other examples, however, a different number of channels, pipelines, stages, and batches may be contemplated and mapped in such a cyclically descending order.

As control circuitry 117 reads out data 106 according to channel order 111, hardware accelerator 118 sequentially processes data 106 via pipelines 119 to produce outputs 120. Hardware accelerator 118 may produce a processed or filtered output for each pipeline corresponding to a respective input channel of input channels 105. Accordingly, there may be the same number of outputs 120 as input channels 105 and pipelines 119. Hardware accelerator 118 may provide outputs 120 downstream to one or more digital processing elements or other subsystems (not shown).

Figure 2:
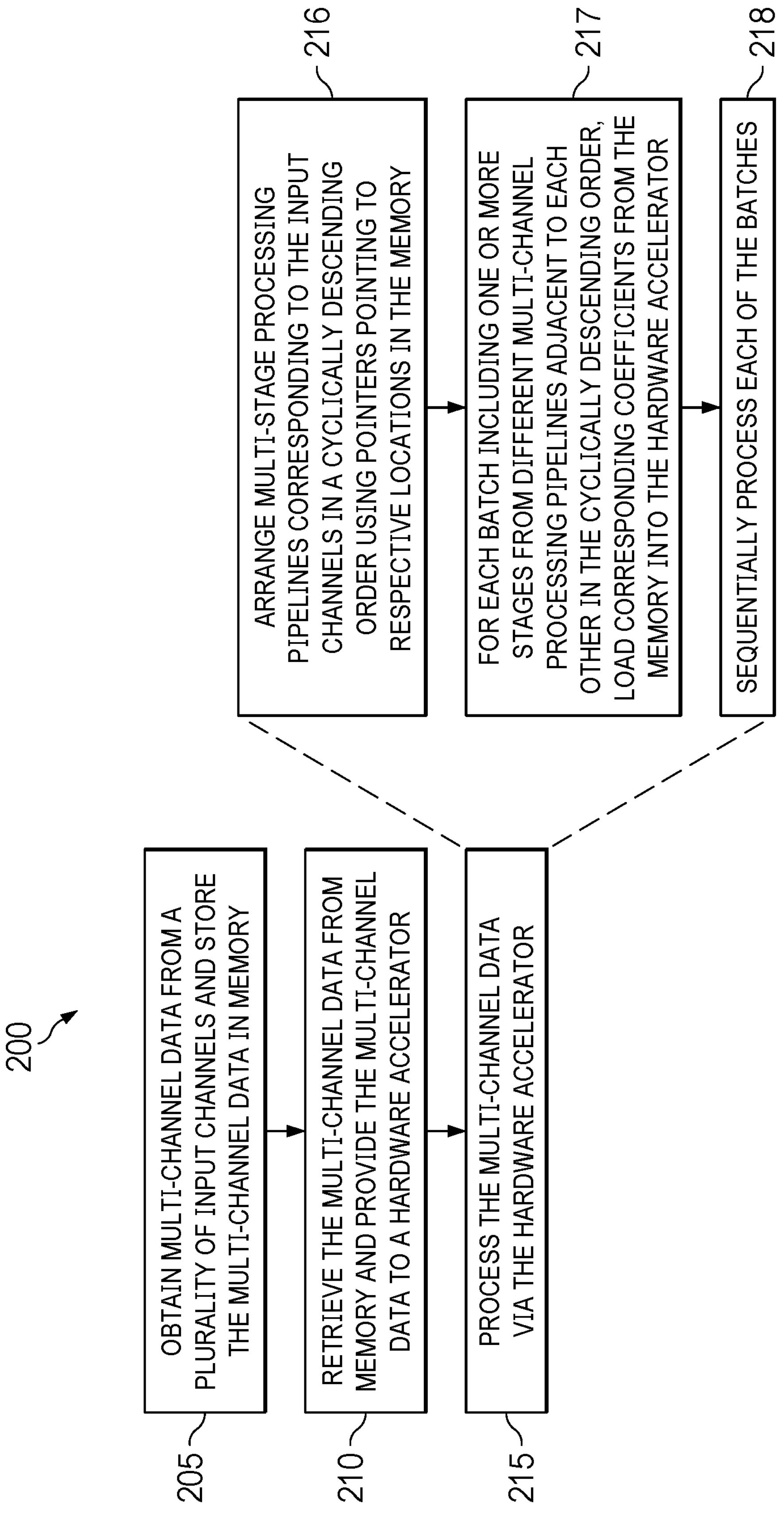
FIG. 2 illustrates a series of steps for reading out data for processing according to a channel order in an implementation.

FIG. 2 illustrates a series of steps for reading out data for processing according to a channel order in an implementation. FIG. 2 includes process 200, which references elements of FIG. 1. Process 200 may be implemented on software, firmware, or hardware, or any combination or variation thereof. Process 200 may be executed by control circuitry or a hardware accelerator of a data processing pipeline, such as control circuitry 117 or hardware accelerator 118 of data processing pipeline 115 of FIG. 1, or by any combination or variation thereof.

In operation 205, data processing pipeline 115 obtains multi-channel data 106 from a plurality of input channels 105 and stores the multi-channel data 106 in memory 116. Input channels 105 are representative of a plurality of inputs coupled to provide data 106 to data processing pipeline 115. Input channels 105 may include any number of channels, and each channel may output different signals relative to one another or the same signals as one or more of the other channels. Data 106 produced by input channels 105 may be analog or digital signals, such as audio or voice signals.

In some embodiments, data processing pipeline 115 is representative of a system capable of obtaining data 106 from the multiple input channels 105, performing one or more operations on data 106, and generating outputs 120, each output corresponding to an input channel. For example, data processing pipeline 115 may be implemented with a digital signal processing (DSP) system, or a portion thereof. In some embodiments, data processing pipeline 115 may include memory 116, control circuitry 117, and hardware accelerator 118.

In some embodiments, memory 116 may include any non-transitory, computer-readable storage media capable of being read from and written to by various components, such as input channels 105, processor 110, control circuitry 117, and hardware accelerator 118, among other elements. In operation 205, data processing pipeline 115 may store data 106 from input channels 105 in memory 116 for use by control circuitry 117 and hardware accelerator 118.

In operation 210, control circuitry 117 of data processing pipeline 115 retrieves the multi-channel data 106 from memory 116 and provides data 106 to hardware accelerator 118. In some embodiments, control circuitry 117 is representative of one or more hardware components capable of controlling hardware accelerator 118 and reading out data 106 from memory 116 to hardware accelerator 118 in accordance with a determined order. To provide data 106 to hardware accelerator 118, control circuitry 117 may be configured to perform one or more load operations whereby control circuitry 117 obtains locations, in memory 116, of coefficients and samples of data 106 and directs hardware accelerator 118 to read from those locations.

In some embodiments, hardware accelerator 118 is representative of one or more hardware components capable of performing one or more operations on data 106 per the determined order. For example, hardware accelerator 118 may implement multi-stage pipelines 119 to process data 106. Pipelines 119 include a plurality of processing pipelines, each pipeline including a plurality of processing stages for processing incoming multi-channel data 106. Accordingly, in some cases, the total number of pipelines 119 may correspond to the total number of input channels 105. Each pipeline may include a number of stages corresponding to a number of operations to be performed on data 106. The number of stages may vary between each of the pipelines 119 and may depend on a desired output with respect to data 106 corresponding to an input channel. For example, one pipeline may have more stages than another pipeline based on a desired fidelity or amount of filtering of data 106 associated with the corresponding input channel. In various examples, the operations that hardware accelerator 118 performs at each stage of pipelines 119 may include filter operations. For instance, each stage may be an infinite impulse response (IIR) filter, such as a biquadratic filter. IIR filters have loop-carry dependencies, such that the output and input of each filter have dependencies on each other. As such, each stage of a pipeline may have loop-carry dependency, and thus, hardware accelerator 118 may process the stages of a pipeline in a sequential order.

In operation 215, hardware accelerator 118 processes the multi-channel data 106. In various examples, hardware accelerator 118 may process data 106 in accordance with a sequential order based on the loop-carry dependency of the pipelines 119. The sequential order may be determined by processor 110 and provided to memory 116 for control circuitry 117 to obtain and use when reading out data 106 to hardware accelerator 118. In some embodiments, processor 110 is representative of one or more processor cores capable of executing software and firmware and is coupled to provide channel order 111 to memory 116 of data processing pipeline 115 for use by control circuitry 117. Such processor cores(s) may include cores of microcontrollers, DSPs, general purpose central processing units, application specific processors or circuits (e.g., ASICs), and logic devices (e.g., FPGAs), as well as any other type of processing device, combinations, or variations thereof.

To determine channel order 111, processor 110 may identify the number of stages of each pipeline in hardware accelerator 118 based on parameters 101. Processor 110 may sort pipelines 119 from greatest to least with respect to the number of stages. Next, processor 110 may determine a batch size that includes subsets of individual stages of pipelines 119 for processing stages of multiple pipelines in parallel. The batch size may be determined based on one or more factors. For example, processor 110 may determine the batch size based on a number of multipliers of hardware accelerator 118, a number of load resources of hardware accelerator 118, a total number of input channels 105 divided by two or based on a multiple of the total number of input channels 105. Alternatively, the batch size may be determined based on the loop-carry dependency of the stages of pipelines 119. The batches may include subsets of the stages across pipelines 119. Some batches may include the same number of stages as each other, but some batches may include fewer stages relative to other batches.

After determining channel order 111, processor 110 may write channel order 111 to memory 116. After storing channel order 111 in memory 116, data 106 may be processed according to the channel order 111 by loading the data 106 using pointers according the channel order 111, and loading the coefficients for the stages of the pipelines 119, also according to the channel order 111, e.g., using pointers. For example, in some embodiments, control circuitry 117, in operation 216, may arrange multi-stage processing pipelines 119 of hardware accelerator 118 corresponding to the input channels 105 in a cyclically descending order using pointers pointing to respective locations in memory 116.

Next, in operation 217, control circuitry 117 may, for each batch, load from memory 116 into hardware accelerator 118 coefficients associated with the stages to be processed in each batch according to the channel order, e.g., using pointers. Each batch may include one or more stages from different ones of pipelines 119 adjacent to each other in the channel order, e.g., which may be a cyclically descending order. In some cases, control circuitry 117 may perform multiple load operations with respect to the coefficients. For example, a first load operation may load one or more of the coefficients, and a second load operation may load one or more different coefficients into hardware accelerator 118. In some such cases where multiple load operations are used, each load operation may load two different coefficients for each pipeline in a batch. Further, in some cases where one or more pipelines are processed across stages, one or more load operations may be used to load coefficients of the two different stages. For example, in an embodiment in which each stage uses 5 coefficients and each load operation is capable of loading 2 coefficients, 3 load operations may be used to load the coefficients for each stage. In this example, if the load operations can be shared across stages, 5 load operations may be used to load the coefficients of 2 stages, thereby advantageously reducing the number of total load operations (2.5 load operations per stage as opposed to 3 load operations per stage).

Using the coefficients and pointers, hardware accelerator 118, in operation 218, may sequentially process each of the batches. Processing the batches according to the cyclically descending order may refer to performing one or more operations, such as IIR filter operations or biquadratic filter operations, on the stages of pipelines 119 in each batch. In some examples, hardware accelerator 118 performs the operations on the multi-channel data using a very large instruction word (VLIW) instruction set architecture or using a single instruction multiple data (SIMD) instruction. As hardware accelerator 118 progresses through channel order 111, some batches may include fewer stages than previously processed batches. When a batch has fewer stages than another batch, hardware accelerator 118 may perform a null operation in parallel with performing an operation on one or more stages in the batch. As hardware accelerator 118 performs the operations on data 106, hardware accelerator 118 produces outputs 120. Hardware accelerator 118 may produce a processed or filtered output for each pipeline corresponding to a respective input channel of input channels 105. Accordingly, there may be the same number of outputs 120 as input channels 105 and pipelines 119. Hardware accelerator 118 may provide outputs 120 downstream to one or more digital processing elements or other subsystems (not shown).

Figure 3A:
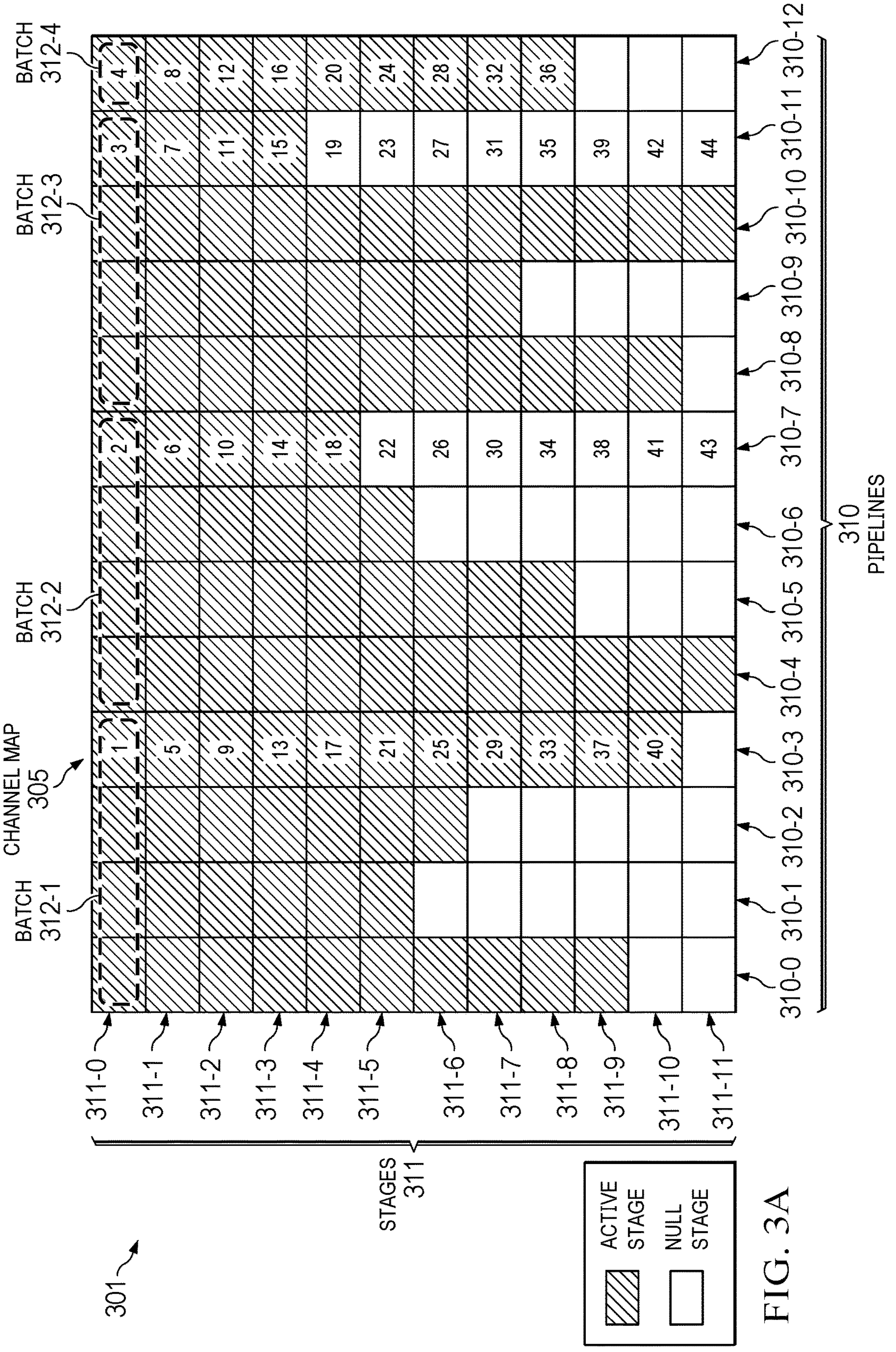
FIGS. 3A, 3B, and 3C illustrate example channel maps in an implementation.
Figure 3B:
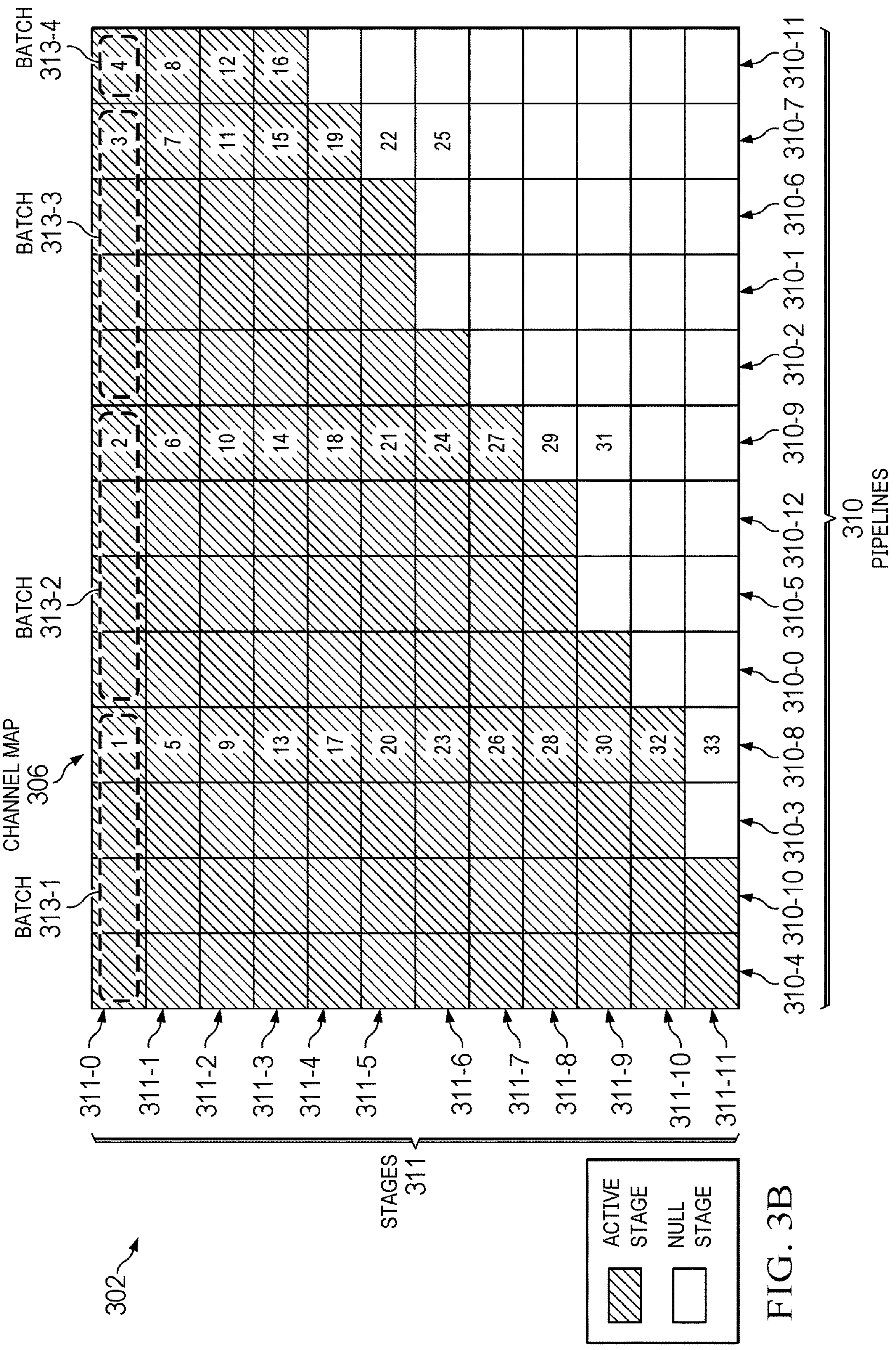
Figure 3C:
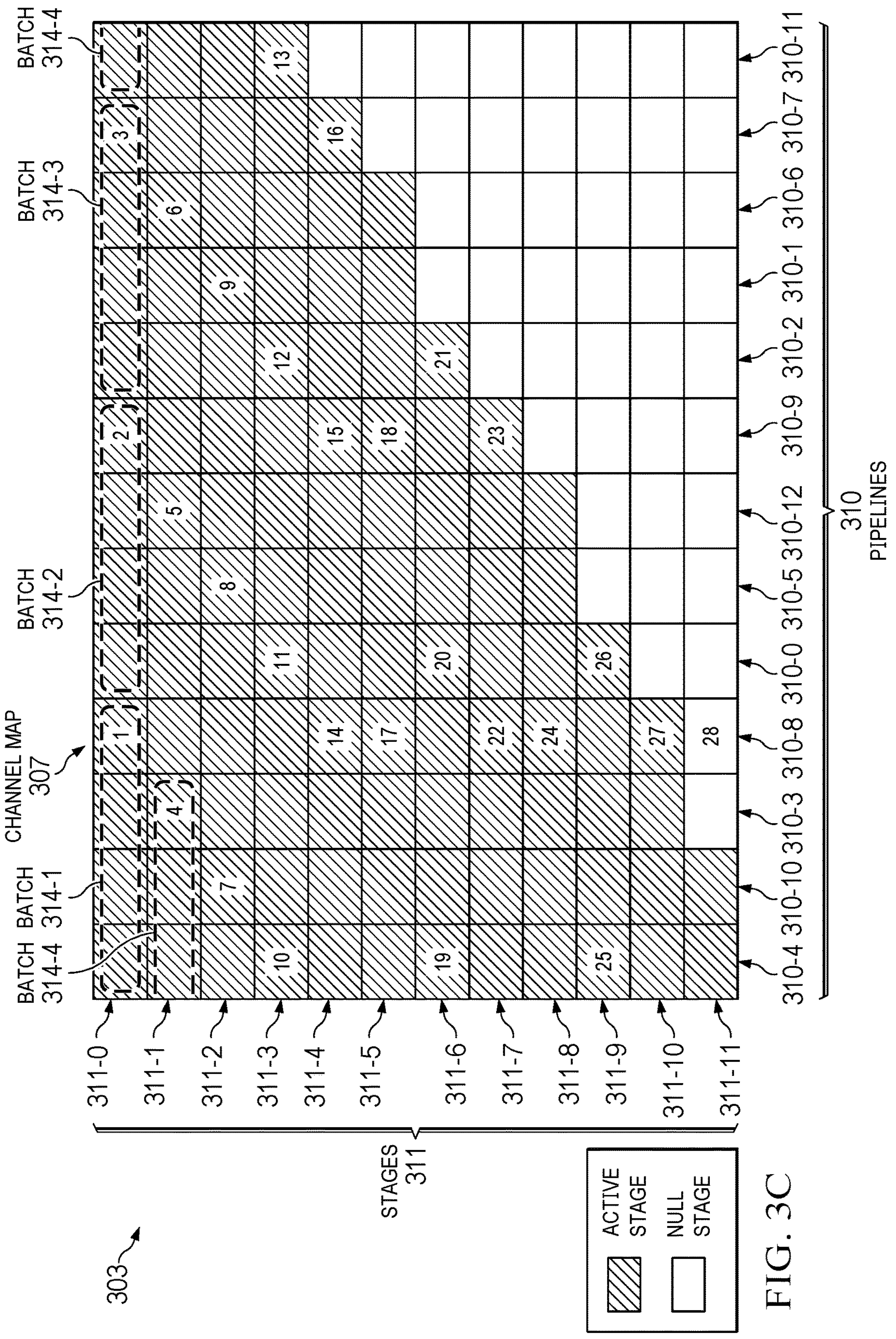

FIGS. 3A, 3B, and 3C illustrate example aspects of a channel map in an implementation. FIGS. 3A, 3B, and 3C show aspects 301, 302, and 303 related to channel maps 305, 306, and 307, respectively. Channel maps 305, 306, and 307 include a plurality of pipelines 310 and a plurality of stages 311 corresponding to individual ones of pipelines 310. In various examples, channel map 307 may define batches of stages 311 across pipelines 310 including a number of stages 311 from different pipelines 310 for processing in parallel. Aspects 301, 302, and 303 illustrate batches 312, 313, and 314 in channel maps 305, 306, and 307, respectively. A processor, such as processor 110 of FIG. 1, may identify channel map 305, which may be used by control circuitry 117 and hardware accelerator 118 of FIG. 1 to process multi-channel data in a sequential, cyclically descending order. For example, channel map 305 may represent channel order 111 of FIG. 1.

Referring first to aspect 301 of FIG. 3A, aspect 301 illustrates channel map 305 comprising thirteen pipelines 310 organized in numerical order from left to right and a maximum of twelve stages 311 for each pipeline organized in numerical order from top to bottom. For example, as shown in FIG. 3A, pipelines 310-4 and 310-10 have each 12 active stages, while pipelines 310-1 and 310-6 have each 6 actives stages. Unused stages 311 in map 305 are illustrated as null stages (e.g., stages 311-6 to 311-11 associated with pipeline 310-1). Such null stages may be unimplemented and/or implemented but programmed to be bypassed/skipped. Thus, in some embodiments, unused stages 311 may be performed by performing a null operation, or be skipped, e.g., by performing another stage instead of the null stage.

In various examples, pipelines 310 are representative of multi-stage processing pipelines that a hardware accelerator (e.g., hardware accelerator 118 of FIG. 1) may implement to process multi-channel data from a plurality of input channels (e.g., input channels 105 of FIG. 1). Accordingly, pipelines 310 may demonstrate a visual representation of pipelines 119 of hardware accelerator 118 of FIG. 1.

Each pipeline of channel map 305 may correspond to an input channel, and each pipeline may have a number of active stages, e.g., ranging from 1-12 stages. For each active stage of a pipeline, a hardware accelerator may perform an operation, such as a filter operation (e.g., IIR filter, biquadratic filter) using data corresponding to that pipeline. An active stage refers to an operation that a hardware accelerator may perform on corresponding data. Inactive stages refer to null operations in pipelines 310. As illustrated in aspect 301, active stages may be denoted as boxes with a striped pattern fill while null stages may be denoted as boxes with white fill without any pattern.

In various examples, stages 311 of individual pipelines have loop-carry dependency. Thus, a hardware accelerator may process stages, or perform operations, of each pipeline in a sequential order from stage 311-0 through stage 311-12, or for however many active stages exist for a particular pipeline. In this example, pipeline 310-0 has ten active stages, pipeline 310-1 has six active stages, pipeline 310-2 has seven active stages, pipeline 310-3 has eleven active stages, pipeline 310-4 has twelve active stages, pipeline 310-5 has nine active stages, pipeline 310-6 has six active stages, pipeline 310-7 has five active stages, pipeline 310-8 has eleven active stages, pipeline 310-9 has eight active stages, pipeline 310-10 has twelve active stages, pipeline 310-11 has four active stages, and pipeline 310-12 has nine active stages. Based on the loop-carry dependency, the hardware accelerator may process stage 311-0 of pipeline 310-0 first, then process stage 311-1 of pipeline 310-0, and so on.

A processor (e.g., 110) may also define batches of pipelines 310 in channel map 305, which may include a subset of pipelines 310 to be processed by the hardware accelerator in parallel. In this example, batches 312-1, 312-2, 312-3, 312-4 . . . 312-44, are collectively referred to as batches 312, with batches 312-1, 312-2, 312-3, and 312-4 being defined and demonstrated across stage 311-0 of pipelines 310. Batch 312-1 includes stage 311-0 of pipelines 310-0, 310-1, 310-2, and 310-3, batch 312-2 includes stage 311-0 of pipelines 310-4, 310-5, 310-6, and 310-7, batch 312-3 includes stage 311-0 of pipelines 310-8, 310-9, 310-10, and 310-11, and batch 312-4 includes stage 311-0 of pipeline 310-12 (e.g., while also include 3 additional null stages so that each batch has the same number of stages: 4). In operation, control circuitry 117 may read out data corresponding to the subsets of pipelines 310 in each batch to the hardware accelerator in a sequential order beginning with batch 312-1. After the hardware accelerator 118 performs operations on pipelines of batch 312-1, control circuitry 117 may read out data corresponding to the subsets of pipelines 310 in batch 312-2. This process may repeat until the hardware accelerator 118 processes the multi-channel data in (e.g., all) active stages 311 of pipelines 310. Accordingly, the control circuitry 117 may read out and the hardware accelerator 118 may process stages 311 of pipelines 310 from left to right with respect to the numerical order of channel map 305 and top to bottom with respect to the numerical order of stages 311. In other examples, however, the control circuitry may read out the data in a different order.

Four batches are illustrated across stage 311-0 of pipelines 310, however, other numbers of pipelines 310 may be included in each batch.

In the example of FIG. 3A, batches may be defined only across individual stages. For example, as shown in FIG. 3A, batches 312-1, 312-2, 312-3, and 312-4 do not span beyond stage 311-0 of pipelines 310. In some examples, some batches may span across multiple stages.

As shown in FIG. 3A, as batches are defined in channel map 305 for stages 311 where one or more pipelines have null stages instead of active stages (e.g., such as in stage 311-4 where pipeline 310-11 has no remaining active stages), the hardware accelerator 118 may begin performing operations on batches less efficiently as a batch may include both active stages and null stages. To alleviate some processing inefficiencies, in some embodiments, a processor (e.g., 110) may reorganize channel map 305 and/or batches of channel map 305.

Referring next to aspect 302 of FIG. 3B, aspect 302 shows channel map 306 that includes pipelines 310 reorganized from most number of active stages to least number of active stages from left to right. This order, from left to right, includes pipelines 310-4, 310-10, 310-3, 310-8, 310-0, 310-5, 310-12, 310-9, 310-2, 310-1, 310-6, 310-7, and 310-11. While the number of pipelines 310 per batch remains the same from aspect 301 to aspect 302, the pipelines 310 in each batch differs. For example, aspect 302 includes batches 313-1, 313-2, 313-3, 313-4 . . . 313-13, which are collectively referred to as batches 313, with batches 313-1, 313-2, 313-3, and 313-4 being defined and demonstrated across stage 311-0 of pipelines 310. Batch 313-1 includes stage 311-0 of pipelines 310-4, 310-10, 310-3, and 310-8, batch 313-2 includes stage 311-0 pipelines 310-0, 310-5, 310-12, and 310-9, batch 313-3 includes stage 311-0 of pipelines 310-2, 310-1, 310-6, and 310-7, and batch 313-4 includes stage 311-0 of pipeline 310-11.

Advantageously, as the hardware accelerator 118 performs operations on each batch of pipelines 310 in a cyclically descending order as defined in channel map 306 of aspect 302, the control circuitry 118 may read out progressively fewer batches per stage after a number of stages (e.g., since a batch that only includes null stages may be skipped), and thus, the hardware accelerator 118 may perform progressively fewer operations relative to processing in accordance with channel map 305 of aspect 301. For example, as shown in FIG. 3B, beginning at stage 311-4, pipeline 310-11 has no remaining active stages, so the processor may only define three batches (batches 313-18, 313-18, and 313-19) for stage 311-4. At stage 311-7, pipelines 310-2, 310-1, 310-6, 310-7, and 310-11 have no remaining active stages, so the processor 110 may only define two batches (batches 313-26 and 313-27) for the eight other pipelines having active stages (with a batch size of four). Thus, this organization may allow control circuitry 117 to skip over pipelines 310 with only null stages remaining when reading data out to the hardware accelerator, which may reduce processing cycles required for the hardware accelerator to process the multi-channel data in accordance with channel map 306.

Referring next to aspect 303 of FIG. 3C, aspect 303 shows channel map 307 that includes, similar to FIG. 3B, pipelines 310 organized from most number of active stages to least number of active stages from left to right. In aspect 303, however, the processor 110 may further define batches across multiple stages 311 of pipelines 310. For example, aspect 303 includes batches 314-1, 314-2, 314-3, 314-4 . . . 314-28, which are collectively referred to as batches 314, where batch 314-1 includes stage 311-0 of pipelines 310-4, 310-10, 310-3, and 310-8, batch 314-2 includes stage 311-0 of pipelines 310-0, 310-5, 310-12, and 310-9, batch 314-3 includes stage 311-0 of pipelines 310-2, 310-1, 310-6, and 310-7, and batch 314-4 includes stage 311-0 of pipeline 310-11 and stage 311-1 of pipelines 310-4, 310-10, and 310-3. While stages 311 of pipelines 310 have loop-carry dependency, control circuitry 117 may read out the multi-channel data 106 and the hardware accelerator 118 may process the multi-channel data for batches 314 in a manner that allows some pipelines 310 of a first stage (e.g., stage 311-0) to be processed by hardware accelerator 118 prior to processing some pipelines 310 of an immediately subsequent stage (e.g., stage 311-1). More specifically, batch 314-1 may be processed prior to processing of batch 314-4 so that results corresponding to stage 311-0 of pipelines 310-4, 310-10, and 310-3 are ready for use in the processing of batch 314-4. Advantageously, by mapping batches of pipelines 310 across stages 311, the processor may define fewer total batches for channel map 305 (28 in FIG. 3B compared to 33 in FIG. 3B), and thus, the hardware accelerator 118 may advantageously use fewer processing cycles to perform operations on the multi-channel data.

While aspects 301, 302, and 303 show thirteen pipelines each having twelve stages or less, a different number of (e.g., maximum) stages, pipelines, and/or active stages thereof may be contemplated.

Figure 4:
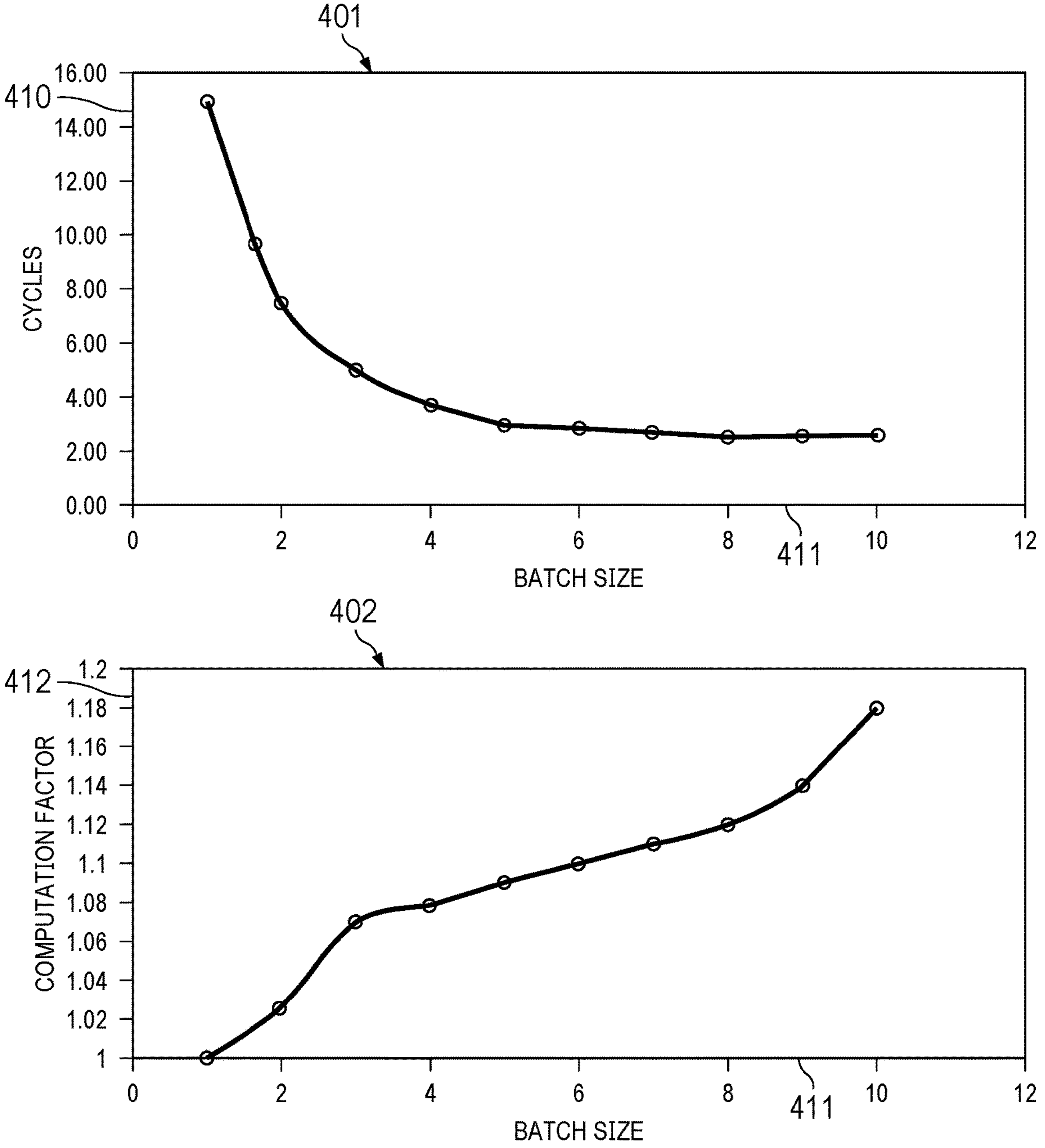
FIG. 4 illustrates example graphical representations for determining batch size for a channel order in an implementation.

FIG. 4 illustrates example graphical representations related to determining batch size for a channel order in an implementation. FIG. 4 includes graphical representation 401 and graphical representation 402, which refer to elements of FIGS. 3A, 3B, and 3C.

Referring first to graphical representation 401, graphical representation 401 illustrates a graph comparing cycles 410 to batch size 411. Cycles 410 may refer to processing cycles. In the context of a hardware accelerator that implements multi-stage pipelines 310 to perform operations on multi-channel data, such as hardware accelerator 118 of FIG. 1, cycles 410 may represent a number of clock cycles per pipeline it takes the hardware accelerator to process a number of pipelines 310 in a batch in parallel. The number of pipelines 310 processed together is referred to as batch size 411. According to graphical representation 401, it follows that the number of cycles 410 may be reduced if an increased number of pipelines 310 are processed in parallel, or in other words, if batch size 411 is increased to a certain degree.

Graphical representation 402 illustrates a graph comparing computation factor 412 to batch size 411. Computation factor 412 may refer to the number of active stages of pipelines 310 processed within a batch relative to the number of null stages of pipelines 310 processed within a batch when processing multi-channel data in accordance with channel map 305. More specifically, and referring first to channel map 306 shown in aspect 302 of FIG. 3B, channel map 306 includes 110 active stages. Batches 313, among other batches, may not be defined across stages of pipelines 310, so a processor (e.g., 110) may identify 33 total batches for channel map 305 of FIG. 3B. Due to this organization of channel map 306 of FIG. 3B and with a batch size of four, ten null operations may be performed in addition to 110 operations (corresponding to the 110 active stages) among all the batches. Referring next to channel map 307 shown in aspect 303 of FIG. 3C, which also includes 110 active stages, batches 314, among other batches, may be defined across stages of pipelines 310. With this organization of channel map 307, the number of null operations may be reduced to two. Thus, computation factor 412 may represent null operations that may be performed when processing all the active stages in the batches of a channel map. According to graphical representation 402, computation factor 412 increases as batch size 411 increase. Therefore, an optimal batch size may be determined by comparing results of graphical representations 401 and 402. More specifically, in some embodiments, the value of computation factor 412 may be determined using the following formula:

Computation Factor=Number of Active Stages within Batches/Number of Null Stages within Batches.

Thus, the cost of processing the operations in accordance with batch size 411 may be determined using the following formula:

Processing cost=(Processing Cycles/Active Stages) *Computation Factor.

Figure 5:
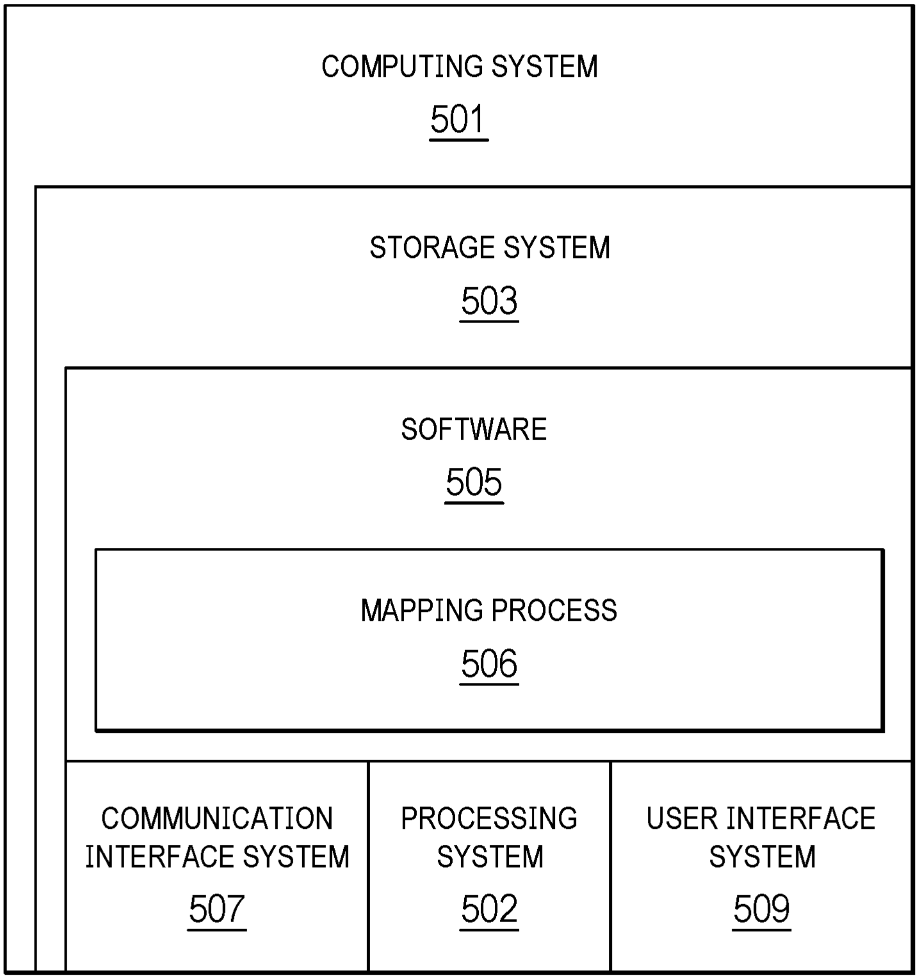
FIG. 5 illustrates an example computer system that may be used in an implementation.

FIG. 5 illustrates computing system 501 to perform multi-stage pipeline ordering according to an implementation of the present technology. In some embodiments, processor 110 may be implemented as computing system 501. Computing system 501 is representative of any system or collection of systems with which the various operational architectures, processes, scenarios, and sequences disclosed herein for memory access may be employed. Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509 (optional). Processing system 502 is operatively coupled with storage system 503, communication interface system 507, and user interface system 509. Computing system 501 may be representative of a cloud computing device, distributed computing device, or the like.

Processing system 502 loads and executes software 505 from storage system 503. Software 505 includes and implements mapping process 506, which is representative of any of the multi-stage processing pipeline organizing, arranging, sorting, loading, and pointing processes discussed with respect to the preceding Figures. When executed by processing system 502 to provide ordering functions, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, graphical processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including mapping process 506) may be implemented in program instructions and among other functions may, when executed by processing system 502, direct processing system 502 to operate as described with respect to the various operational scenarios, sequences, and processes illustrated herein. For example, software 505 may include program instructions for implementing a multi-stage processing pipeline ordering process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide memory access as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

Example embodiments of the present disclosure are summarized here. Other embodiments can also be understood from the entirety of the specification and the claims filed herein.

Example 1. A method, including: retrieving multi-channel data from a memory; and processing the multi-channel data with a hardware accelerator implementing a multi-stage processing pipeline for each channel of a plurality of channels, where the multi-stage processing pipelines are arranged in a cyclically descending order based on a total number of stages of each multi-stage processing pipeline; where processing the multi-channel data includes sequentially processing a plurality of batches, where each batch of the plurality of batches includes one or more stages from different multi-stage processing pipelines and that are adjacent to each other in the cyclically descending order, and where processing each batch of the plurality of batches includes processing the corresponding one or more stages in parallel; where a first batch of the plurality of batches includes a plurality of stages; and where each stage of the multi-stage processing pipeline of each channel has a loop-carry dependency.

Example 2. The method of example 1, where one or more subsequent batches relative to the first batch includes fewer stages than the first batch.

Example 3. The method of one of examples 1 or 2, where processing a batch of the one or more subsequent batches includes performing a null operation in parallel with processing one or more stages corresponding to the batch of the one or more subsequent batches.

Example 4. The method of one of examples 1 to 3, where processing each of the one or more subsequent batches further includes skipping over one or more stages of one or more multi-stage processing pipelines in the cyclically descending order.

Example 5. The method of one of examples 1 to 4, where none of the batches are defined across multiple stages of the multi-stage processing pipelines.

Example 6. The method of one of examples 1 to 5, where some of the batches are defined across multiple stages of the multi-stage processing pipelines.

Example 7. The method of one of examples 1 to 6, where a size of the batches is determined based on one or more of a number of multipliers of the hardware accelerator, a number of load resources of the hardware accelerator, and the loop-carry dependency of the stages.

Example 8. The method of one of examples 1 to 7, where a size of the batches is determined based on a total number of channels in the plurality of channels divided by two.

Example 9. The method of one of examples 1 to 8, where a size of the batches is a multiple of a total number of channels in the plurality of channels.

Example 10. The method of one of examples 1 to 9, where the total number of stages of each multi-stage processing pipeline differs between three or more of the multi-stage processing pipelines.

Example 11. The method of one of examples 1 to 10, where the cyclically descending order is determined by identifying the total number of stages of each multi-stage processing pipeline and sorting the multi-stage processing pipelines from greatest to least with respect to the total numbers of stages.

Example 12. The method of one of examples 1 to 11, where to process the multi-channel data, the hardware accelerator performs operations on the multi-channel data using a very large instruction word (VLIW) instruction set architecture or using a single instruction multiple data (SIMD) instruction.

Example 13. The method of one of examples 1 to 12, where a number of the operations is based on a number of stages of all the multi-stage processing pipelines.

Example 14. The method of one of examples 1 to 13, where each of the plurality of batches includes the same number of stages.

Example 15. The method of one of examples 1 to 14, further including arranging the multi-stage processing pipelines in the cyclically descending order using pointers pointing to respective locations in the memory.

Example 16. The method of one of examples 1 to 15, where sequentially processing the plurality of batches includes for each batch of the plurality of batches, loading corresponding coefficients from the memory into the hardware accelerator.

Example 17. The method of one of examples 1 to 16, where loading corresponding coefficients from the memory into the hardware accelerator includes using a load operation capable of loading multiple coefficients within the same load operation, and where at least one load operation loads coefficients of different stages from memory into the hardware accelerator.

Example 18. The method of one of examples 1 to 17, where each stage of the multi-stage processing pipeline of each channel is an IIR filter.

Example 19. The method of one of examples 0 to 18, where each stage of the multi-stage processing pipeline of each channel is a Biquadratic filter.

Example 20. A device, including: memory; and a hardware accelerator coupled to the memory and configured to: retrieve multi-channel data from the memory; and process the multi-channel data by implementing a multi-stage processing pipeline for each channel of a plurality of channels, where the multi-stage processing pipelines are arranged in a cyclically descending order based on a total number of stages of each multi-stage processing pipeline; where processing the multi-channel data includes sequentially processing a plurality of batches, where each batch of the plurality of batches includes one or more stages from different multi-stage processing pipelines and that are adjacent to each other in the cyclically descending order, and where processing each batch of the plurality of batches includes processing the corresponding one or more stages in parallel; where a first batch of the plurality of batches includes a plurality of stages; and where each stage of the multi-stage processing pipeline of each channel has a loop-carry dependency.

Example 21. The device of example 20, where one or more subsequent batches relative to the first batch includes fewer stages than the first batch.

Example 22. The device of one of examples 20 or 21, where processing each of the one or more subsequent batches further includes skipping over one or more stages of one or more multi-stage processing pipelines in the cyclically descending order.

Example 23. The device of one of examples 20 to 22, where none of the batches are defined across multiple stages of the multi-stage processing pipelines.

Example 24. The device of one of examples 20 to 23, where some of the batches are defined across multiple stages of the multi-stage processing pipelines.

Example 25. The device of one of examples 20 to 24, where a size of the batches is determined based on one or more of a number of multipliers of the hardware accelerator, a number of load resources of the hardware accelerator, and the loop-carry dependency of the stages.

Example 26. The device of one of examples 20 to 25, where a size of the batches is determined based on a number of the channels divided by two.

Example 27. The device of one of examples 20 to 26, where the total number of stages of each multi-stage processing pipeline differs between two or more of the multi-stage processing pipelines.

Example 28. The device of one of examples 20 to 27, where the cyclically descending order is determined by identifying the total number of stages of each multi-stage processing pipeline and sorting the multi-stage processing pipelines from greatest to least with respect to the total numbers of stages.

Example 29. The device of one of examples 20 to 28, where to process the multi-channel data, the hardware accelerator circuitry performs operations on the multi-channel data using a very large instruction word (VLIW) instruction set architecture or using a single instruction multiple data (SIMD) instruction.

Example 30. The device of one of examples 20 to 29, where a number of the operations is based on a number of stages of all the multi-stage processing pipelines.

Example 31. An integrated circuit, including: control circuitry; and hardware accelerator circuitry; where the control circuitry is configured to identify multi-channel data from a memory and provide the multi-channel data to the hardware accelerator circuitry in response to a request to process the multi-channel data; and where the hardware accelerator circuitry is configured to process the multi-channel data by implementing a multi-stage processing pipeline for each channel of a plurality of channels, where the multi-stage processing pipelines are arranged in a cyclically descending order based on a total number of stages of each multi-stage processing pipeline; where processing the multi-channel data includes sequentially processing a plurality of batches, where each batch of the plurality of batches includes one or more stages from different multi-stage processing pipelines and that are adjacent to each other in the cyclically descending order, and where processing each batch of the plurality of batches includes processing the corresponding one or more stages in parallel; where a first batch of the plurality of batches includes a plurality of stages; and where each stage of the multi-stage processing pipeline of each channel has a loop-carry dependency.

Example 32. The integrated circuit of example 31, where one or more subsequent batches relative to the first batch includes fewer stages than the first batch.

Example 33. The integrated circuit of one of examples 31 or 32, where processing each of the one or more subsequent batches further includes skipping over one or more stages of one or more multi-stage processing pipelines.

Example 34. The integrated circuit of one of examples 31 to 33, where none of the batches are defined across multiple stages of the multi-stage processing pipelines.

Example 35. The integrated circuit of one of examples 31 to 34, where some of the batches are defined across multiple stages of the multi-stage processing pipelines.

Example 36. The integrated circuit of one of examples 31 to 35, where a size of the batches is determined based on one or more of a number of multipliers of the hardware accelerator, a number of load resources of the hardware accelerator, and the loop-carry dependency of the stages.

Example 37. The integrated circuit of one of examples 31 to 36, where a size of the batches is determined based on a number of the channels divided by two.

Example 38. The integrated circuit of one of examples 31 to 37, where the total number of stages of each multi-stage processing pipeline differs between three or more of the multi-stage processing pipelines.

Example 39. The integrated circuit of one of examples 31 to 38, where the cyclically descending order is determined by identifying the total number of stages of each multi-stage processing pipeline and sorting the multi-stage processing pipelines from greatest to least with respect to the total numbers of stages.

Example 40. The integrated circuit of one of examples 31 to 39, where to process the multi-channel data, the hardware accelerator circuitry performs operations on the multi-channel data using a very large instruction word (VLIW) instruction set architecture.

Example 41. The integrated circuit of one of examples 31 to 40, where a number of the operations is based on a number of stages of all the multi-stage processing pipelines.

While some examples provided herein are described in the context of audio, voice, and/or digital processing systems, control circuitry, hardware accelerator circuitry, electrical components and environments thereof, the systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The phrases "in some embodiments." "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A method, comprising:

retrieving multi-channel data from a memory; and processing the multi-channel data with a hardware accelerator implementing a multi-stage processing pipeline for each channel of a plurality of channels, wherein the multi-stage processing pipelines are arranged in a cyclically descending order based on a total number of stages of each multi-stage processing pipeline;

wherein processing the multi-channel data comprises sequentially processing a plurality of batches, wherein each batch of the plurality of batches comprises one or more stages from different multi-stage processing pipelines and that are adjacent to each other in the cyclically descending order, and wherein processing each batch of the plurality of batches comprises processing the corresponding one or more stages in parallel;

wherein a first batch of the plurality of batches comprises a plurality of stages; and wherein each stage of the multi-stage processing pipeline of each channel has a loop-carry dependency; and wherein each batch corresponds to a distinct hardware execution cycle of the hardware accelerator.

2. The method of claim 1, wherein one or more subsequent batches relative to the first batch comprises fewer stages than the first batch; and wherein, for the one or more subsequent batches, execution cycles corresponding to absent stages of shorter multi-stage processing pipelines are not issued by the hardware accelerator, reducing a total number of issued processing cycles.

3. The method of claim 2, wherein processing a batch of the one or more subsequent batches comprises performing a null operation in parallel with processing one or more stages corresponding to the batch of the one or more subsequent batches.

4. The method of claim 2, wherein processing each of the one or more subsequent batches further comprises skipping over one or more stages of one or more multi-stage processing pipelines in the cyclically descending order.

5. The method of claim 1, wherein none of the batches are defined across multiple stages of the multi-stage processing pipelines.

6. The method of claim 1, wherein some of the batches are defined across multiple stages of the multi-stage processing pipelines.

7. The method of claim 1, wherein a size of the batches is determined based on one or more of a number of multipliers of the hardware accelerator, a number of load resources of the hardware accelerator, and the loop-carry dependency of the stages.

8. The method of claim 1, wherein a size of the batches is determined based on a total number of channels in the plurality of channels divided by two.

9. The method of claim 1, wherein a size of the batches is a multiple of a total number of channels in the plurality of channels.

10. The method of claim 1, wherein the total number of stages of each multi-stage processing pipeline differs between three or more of the multi-stage processing pipelines.

11. The method of claim 1, wherein the cyclically descending order is determined by identifying the total number of stages of each multi-stage processing pipeline and sorting the multi-stage processing pipelines from greatest to least with respect to the total numbers of stages.

12. The method of claim 1, wherein to process the multi-channel data, the hardware accelerator performs operations on the multi-channel data using a very large instruction word (VLIW) instruction set architecture or using a single instruction multiple data (SIMD) instruction.

13. The method of claim 12, wherein a number of the operations is based on a number of stages of all the multi-stage processing pipelines.

14. The method of claim 1, wherein each of the plurality of batches comprises the same number of stages.

15. The method of claim 1, further comprising arranging the multi-stage processing pipelines in the cyclically descending order using pointers pointing to respective locations in the memory.

16. The method of claim 1, wherein sequentially processing the plurality of batches comprises for each batch of the plurality of batches, loading corresponding coefficients from the memory into the hardware accelerator.

17. The method of claim 16, wherein loading corresponding coefficients from the memory into the hardware accelerator comprises using a load operation capable of loading multiple coefficients within the same load operation, and wherein at least one load operation loads coefficients of different stages from memory into the hardware accelerator.

18. The method of claim 1, wherein each stage of the multi-stage processing pipeline of each channel is an IIR filter.

19. The method of claim 1, wherein each stage of the multi-stage processing pipeline of each channel is a Biquadratic filter.

20. A device, comprising:

memory; and a hardware accelerator coupled to the memory and configured to:

retrieve multi-channel data from the memory; and process the multi-channel data by implementing a multi-stage processing pipeline for each channel of a plurality of channels, wherein the multi-stage processing pipelines are arranged in a cyclically descending order based on a total number of stages of each multi-stage processing pipeline;

wherein processing the multi-channel data comprises sequentially processing a plurality of batches, wherein each batch of the plurality of batches comprises one or more stages from different multi-stage processing pipelines and that are adjacent to each other in the cyclically descending order, and wherein processing each batch of the plurality of batches comprises processing the corresponding one or more stages in parallel;

wherein a first batch of the plurality of batches comprises a plurality of stages;

wherein each stage of the multi-stage processing pipeline of each channel has a loop-carry dependency; and wherein each batch corresponds to a distinct hardware execution cycle of the hardware accelerator.

21. The device of claim 20, wherein one or more subsequent batches relative to the first batch comprises fewer stages than the first batch, and wherein, for the one or more subsequent batches, execution cycles corresponding to absent stages of shorter multi-stage processing pipelines are not issued by the hardware accelerator, reducing a total number of issued processing cycles.

22. The device of claim 21, wherein processing each of the one or more subsequent batches further comprises skipping over one or more stages of one or more multi-stage processing pipelines in the cyclically descending order.

23. The device of claim 20, wherein none of the batches are defined across multiple stages of the multi-stage processing pipelines.

24. The device of claim 20, wherein some of the batches are defined across multiple stages of the multi-stage processing pipelines.

25. The device of claim 20, wherein a size of the batches is determined based on one or more of a number of multipliers of the hardware accelerator, a number of load resources of the hardware accelerator, and the loop-carry dependency of the stages.

26. An integrated circuit, comprising:

control circuitry; and hardware accelerator circuitry;

wherein the control circuitry is configured to identify multi-channel data from a memory and provide the multi-channel data to the hardware accelerator circuitry in response to a request to process the multi-channel data; and wherein the hardware accelerator circuitry is configured to process the multi-channel data by implementing a multi-stage processing pipeline for each channel of a plurality of channels, wherein the multi-stage processing pipelines are arranged in a cyclically descending order based on a total number of stages of each multi-stage processing pipeline;

wherein processing the multi-channel data comprises sequentially processing a plurality of batches, wherein each batch of the plurality of batches comprises one or more stages from different multi-stage processing pipelines and that are adjacent to each other in the cyclically descending order, and wherein processing each batch of the plurality of batches comprises processing the corresponding one or more stages in parallel;

wherein a first batch of the plurality of batches comprises a plurality of stages;

wherein each stage of the multi-stage processing pipeline of each channel has a loop-carry dependency; and wherein each batch corresponds to a distinct hardware execution cycle of the hardware accelerator circuitry.

* * * * *